J. J. MAGRADY.
BEARING SUPPORT FOR SCALE PIT LEVERS.
APPLICATION FILED DEC. 12, 1921.
1,436,769.
Patented Nov. 28, 1922.
2 SHEETS—SHEET 2.
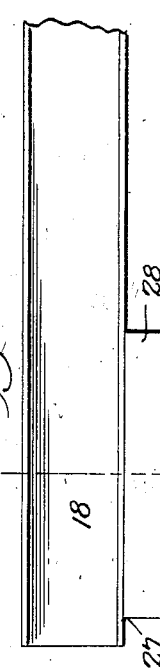
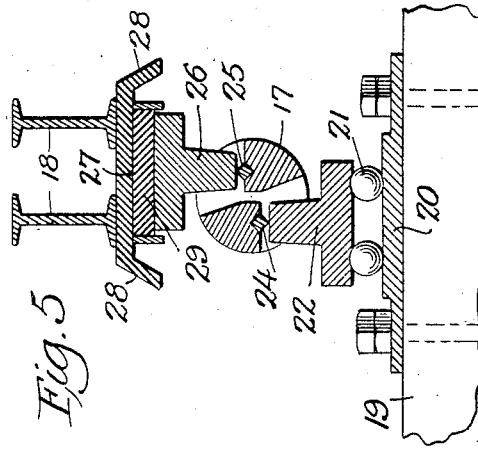
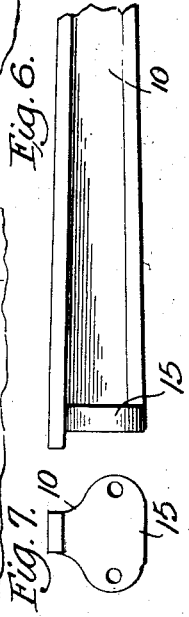
Inventor,
J. J. Magrady.
Thomas R. Harner
Attorney Patented Nov. 28, 1922.

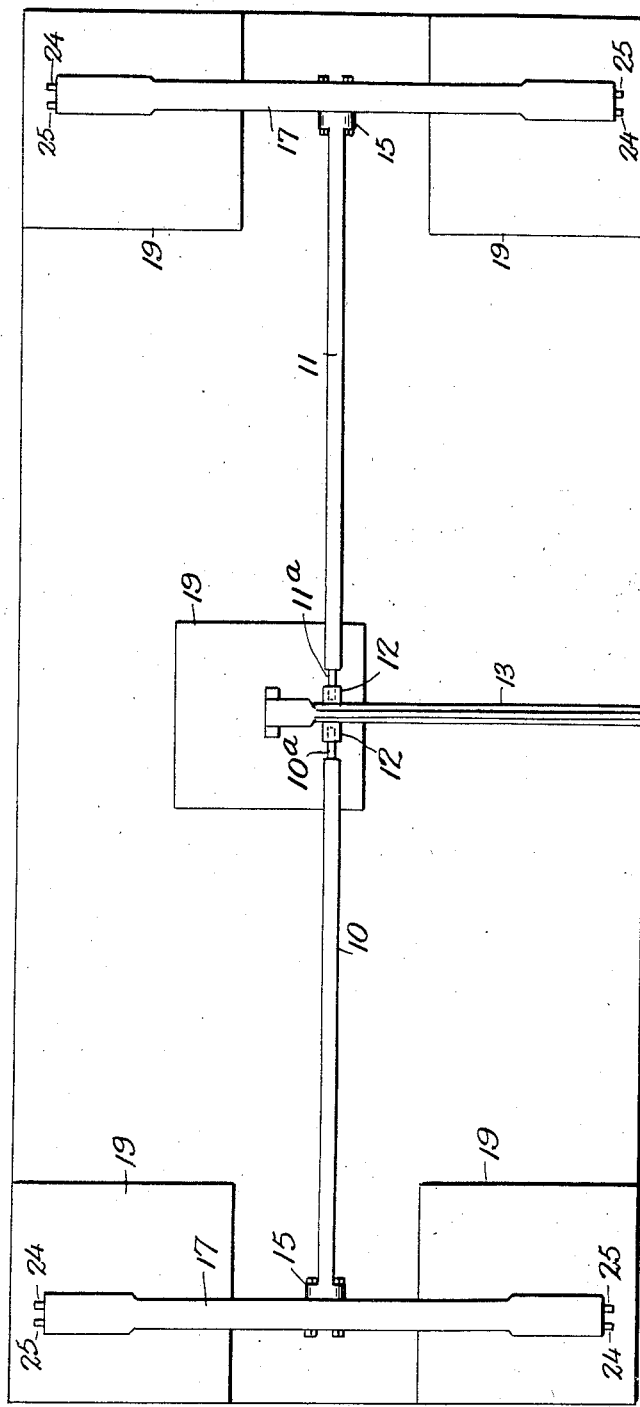
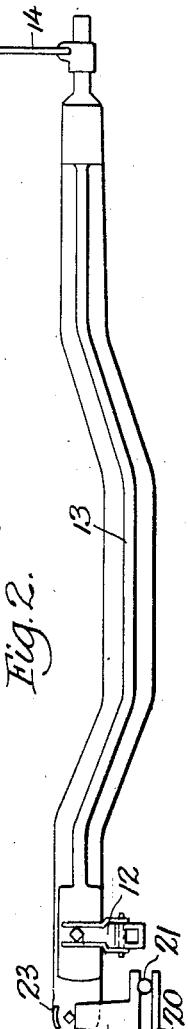

1,436,769

UNITED STATES PATENT OFFICE.

JOSEPH J. MAGRADY, OF CHICAGO, ILLINOIS.

BEARING SUPPORT FOR SCALE-PIT LEVERS.

Application filed December 12, 1921. Serial No. 521,805.

*To all whom it may concern:*

Be it known that I, JOSEPH J. MAGRADY, a citizen of the United States of America, residing at Chicago, in the county of Cook and State of Illinois, have invented certain new and useful Improvements in Bearing Supports for Scale-Pit Levers, of which the following is a specification.

My present invention relates generally to scales, and more particularly to wagon scales and my object is to improve the supports or bearings of the pit levers of such scales whereby a more lasting and durable apparatus may be formed, whereby destructive shocks and electrosis, whereby the usual frequent repairs and replacements will be avoided, free action insured, and upkeep costs greatly reduced.

In carrying out my present invention, I propose the bearing structure for pit levers shown in the accompanying drawings, which form a part of this specification, and in which, Figure 1 is a top plan view showing the general arrangement of the parts, Figure 2 is a side view of the central cross lever, Figure 3 is a side view of one of the oscillatory cross shafts, Figure 4 is a side view of one of the bearings of the cross shafts, Figure 5 is a vertical section taken on line 5—5 of Figure 4, Figure 6 is a side view of one of the main levers, and Figure 7 is an end view thereof.

Referring now to these figures and particularly to Figure 1, I have shown two main levers 10 and 11 whose inner ends 10ª and 11ª connect to hangers 12 adjacent to one pivoted end of the central cross lever 13 whose opposite end as usual connects to overhead weighing beams, a portion of the connection being seen at 14 in Figure 2. The outer flanged and apertured ends 15 of the main levers 10 and 11, seen in Figure 7 are securely fastened to the central apertured faces 16 of outer cross shafts 17 and the ends of these shafts are mounted to oscillate on bearing supports under control of the scale deck of which cross members appear at 18 in Figures 4 and 5.

The bearing of the cross lever 13 and the bearings of the ends of the cross shafts 17, are supported upon piers 19, preferably of concrete, rising in the scale pit in practice and presenting upper flat faces for the reception of ball supporting plates 20 which, like the balls 21 disposed thereon and the pedestals 22 resting freely on the balls 21, are preferably formed of hardened metals and are capable of long service without repair or replacement.

The ball supporting plates 20 are bolted or otherwise anchored to the piers 19 and by means of the balls 21, the bearing pedestals are capable of such free action that even should the pit in practice become partially filled with débris, the parts will free themselves sufficiently to insure accuracy in weighing.

In the case of the central cross lever 13, its lateral knife bearing members 23 rest directly on its pedestal 22 as in Figure 2, while in the case of the ends of the cross shafts 17, the downwardly presented knife bearing members 24 at one side of the axes thereof, directly engage the pedestals 22 while the upwardly presented knife bearing members 25 at the opposite side of the axes thereof engage the lower faces of supporting blocks 26.

The supporting blocks 26 receive the deck thereon in practice, cover plates 27 being disposed on the blocks and having downwardly inclined side flanges 28 so as to thus form in effect housings for the protection of each shaft bearing as a whole. The cross members 18 of the deck (not otherwise shown) rest on the cover plates 27 and as seen in Figure 5 in particular, rubber or other suitable compressible material as at 29 is utilized in the form of a pad between each block 26 and its cover plate 27 so that electrosis will be defeated and shocks and jolts will be absorbed, increasing the life and effectiveness of the parts especially in accuracy during operation.

I claim:

1. The combination with a main scale lever having a cross shaft provided with recessed ends forming endwise projecting oppositely facing knife bearing supporting extensions, knife bearing members on said extensions, a bearing support at each end including ball supporting means, balls on said means, a pedestal resting on the balls and engaged by one of said knife bearing members, and deck supporting means including blocks resting on the other knife bearing members and cover plates over the said blocks forming housing members for the bearing supports.

2. The combination with a main scale lever having a cross shaft provided with recessed ends forming endwise projecting oppositely facing knife bearing supporting extensions, knife bearing members on said extensions, a bearing support at each end including ball supporting means, balls on said means, a pedestal resting on the balls and engaged by one of said knife bearing members, and deck supporting means including blocks resting on the other knife bearing members, cover plates over the said blocks having downwardly inclined side flanges projecting laterally beyond the knife bearings and their supporting extensions, and flexible nonconducting pads between said blocks and said plates.

3. The combination of main scale levers, a cross lever with which the inner ends of the main levers loosely engage, cross shafts to which the outer ends of the main levers are attached, and pit supports for the inner end of the cross lever and the opposite ends of said cross shafts, with respect to which supports the said levers and cross shafts are shiftable horizontally in all directions.

4. The combination of main scale levers, a cross lever with which the inner ends of the main levers loosely engage, cross shafts to which the outer ends of the main levers are attached, and pit supports for the inner end of the cross lever and the opposite ends of said cross shafts including ball bearing pedestals shiftable horizontally in all directions.

5. A cross shaft for a pit scale main lever, of cylindrical form throughout, having knife bearing members at each end, located at diametrically opposite sides of its axis and within the limits of its cylindrical surface.

In testimony whereof I have affixed my signature.

JOSEPH J. MAGRADY.